United States Patent [19]

Whang et al.

[11] Patent Number: 5,638,863

[45] Date of Patent: Jun. 17, 1997

[54] AMPLIFYING SYSTEM FOR SOLENOID CONTROLLED PROPORTION VALVE

[75] Inventors: Bong-Dong Whang; Seong-Ho Lee, both of Changwon-shi, Rep. of Korea

[73] Assignee: Samsung Heavy Industry Co., Ltd, Rep. of Korea

[21] Appl. No.: 228,743

[22] Filed: Apr. 18, 1994

[30] Foreign Application Priority Data

Apr. 16, 1993 [KR] Rep. of Korea ............ 93-6456

[51] Int. Cl.$^6$ ............ F16K 31/06
[52] U.S. Cl. ............ 137/624.11; 251/129.08
[58] Field of Search ............ 251/129.08, 129.01, 251/129.05; 137/624.11, 624.13

[56] References Cited

U.S. PATENT DOCUMENTS

| | | | |
|---|---|---|---|
| 4,103,695 | 8/1978 | Aono | 251/129.08 |
| 4,503,841 | 3/1985 | Tsukaya et al. | 137/624.11 X |
| 4,562,552 | 12/1985 | Miyaoka et al. | 137/624.11 X |

*Primary Examiner*—Kevin Lee
*Attorney, Agent, or Firm*—Lieberman & Nowak, LLP

[57] ABSTRACT

This invention is concerned with an amplifying system with a microprocessor which makes it possible to adjust parameters easily with a simple construction and to perform automatically a simple repeating work without manual operation. The system is also provided with a safety mechanism to prevent system errors, an alarm unit and a display unit to indicate erroneous operations and a failure diagnosis means to detect failure. The microprocessor of the amplifying system operates at least one solenoid proportion valve by producing a control signal consisting either of dither signals of a triangular wave or of pulse signals of a variable duty cycle.

9 Claims, 7 Drawing Sheets

AMPLIFYING SYSTEM FOR SOLENOID CONTROLLED PROPORTION VALVE

BACKGROUND OF THE INVENTION

1. Field of the Invention

The present invention generally relates to an amplifying system for a solenoid controlled proportion valve used in a hydraulic system, and more particularly to an intelligent amplifying system having a fault diagnosis function and a protective function in the hydraulic system.

2. Description of Prior Art

FIG. 1 shows a schematic view of a mechanism for controlling a conventional solenoid controlled proportion valve, in which an amplifying circuit 1 for the solenoid controlled proportion valve (hereinafter, referred to as "proportion valve") controls an operation of the proportion valve in response to operating signals provided from operating members such as an electric joystick 2, an electric pedal 3, and an external controller 4 having a function similar to those of the members 2 and 3.

When an electric current is transmitted from the amplifying circuit 1, to the proportion valve 5, a spool (not shown) in the proportion valve 5 moves in response to the transmitted amount of an electric current. Accordingly, an oil pressure (or a flow amount) can be controlled by a displacement of the spool.

FIG. 2 illustrates a conventional analog amplifying circuit.

Referring to FIG. 2, the operating signal provided from operating members (see reference numerals 2, 3 and 4 shown in FIG. 1) is transmitted to the amplifying circuit 1 through an input terminal 31. The input signal is then transmitted to four limiters 36, 36a, 36b and 36c composed of Schmidt trigger circuit, respectively.

The first trip point setting unit 32 determines the lower trip point which corresponds to 10% of the input signal amplitude. The limiters 36 and 36b operated by the first trip point setting unit 32 and inverters 35a, 35b, 35c put the first proportion valve 1 into an enable state and the second proportion valve 5a into a disable state when the input signal is above the first lower trip point.

The function of limiters 36 and 36b, for example in hydraulic equipments, is accomplished in such a way that in its forward move the first proportion valve is put to enable state with the second proportion valve put to disable state, and in its backward move each valve is put to the opposite state, respectively.

The upper trip point corresponding to 90% of the input signal is determined by the second trip point setting unit 32a. When the input signal is higher than the first upper trip point (90%) or lower than the second upper trip point (-90%), the range limiters 36a and 36c allow a maximum amount of current (I limit) to be transmitted to the proportion valves 5 and 5a as shown in FIG. 3 which represents input/output characteristic graph of amplifying circuit 1.

An offset current (I offset) shown in FIG. 3 is set by an offset setting unit 33, and an amplitude of the offset current (I offset) can be controlled by a variable resistor (not shown). The input signal provided from the operating means through the input terminal 31 to the amplifying circuit 1 is transmitted to two adders 38 and 38a after the input signal has been controlled to take a predetermined gain determined by a gain adjusting member 34.

A dither generator 37 is employed to make use of the principle that it is easier to move the moving body than to move the fixed body. The dither generator 37 generates a dither signal for enhancement of mechanical response characteristics by trembling each spool of the proportion valves 5 and 5a with a very small displacement. The dither signal is a voltage signal of a triangular wave having a predetermined frequency and amplitude.

The adders 38 and 38a add the offset signal to the output and dither signals of the gain adjusting member 34 while the adder 38a receives an inversion output of the gain adjusting members 34 through an inverter 35, 35a, 35b and 35c.

An output signal controllers 39 and 39a are operated in such a manner that the ratio of output signal to input signal in the amplifying circuit 1 is kept constant based on a signal provided from a current sensor 40 which detects a current amount supplied to the proportion valves 5 and 5a.

Pulse width modulators 42 and 42a compare the output signals of controllers 39 and 39a with those of current limiters 41 and 41a which prevent an overcurrent from flowing and that of a carrier generator 43 generating a triangular wave, and then, from the above comparison, generate a pulse width modulation wave of a variable duty.

Current supplying units 44 and 44a can be subject to ON state or OFF state depending on the output of the pulse width modulators 42 and 42a, so that the current amount supplied from a power supply (not shown) to the proportion valves 5 and 5a can be controlled.

Accordingly, the operation of the proportion valves 5 and 5a are controlled by the current amount supplied by way of the current supplying units 44 and 44a.

In the conventional analog amplifying system mentioned in the above, in order to perform a gain adjusting, an amplitude setting of the offset signal, a frequency and amplitude adjusting of dither signal, etc., the values of variable resistors included in the offset setting portion 33, the gain controller 34 and the dither generator 37 respectively should be adjusted one by one by a trial and error method.

However, such a conventional parameter control method has drawbacks that it causes the reduction of the yield of products and lowers the reliability of products. In addition, since the conventional system is comprised of only analog elements in a whole system, it has a complicated structure.

In particular, if the proportion valve is replaced with that of another model, it is impossible for the ordinary experts to reset parameters working with the replaced valve.

Also, in the conventional system, there is not provided a safety mechanism for preventing an accident if, for example, the equipment is erroneously operated due to an undesirable contact with input operating elements when an operator gets in and out of the operation seat.

Thus it would be desirable to provide a safety device for preventing the accidents in driving the system.

In addition, the conventional system is not provided with a failure diagnosis function which is capable of managing effectively the accidents when the system errors occur.

SUMMARY OF THE INVENTION

The primary object of the present invention is to provide an amplifying system having a microprocessor to make it possible to adjust parameters easily with a simple circuit design.

Another object of the present invention is to provide an intelligent amplifying system to control the valve operation making it possible to perform automatically a simple repeating work without any manual operation.

Still another object of the present invention is to provide an amplifying system having a safety mechanism by which system errors can be prevented.

Still another object of the present invention is to provide an amplifying system capable of increasing an efficiency of equipment with a self-failure diagnosis function.

In order to accomplish the above-mentioned objects, there is provided an amplifying system for controlling an operation of at least one solenoid controlled proportion valve by providing a control signal in response to an input operating signal provided from an input operating means to a control terminal of at least one current supplying means connected to the solenoid controlled proportion valve, comprising: a means for generating dither signals of a triangular wave having a predetermined frequency and amplitude by predetermined parameters; a means for generating pulse signals of a variable duty having a predetermined gain in response to the input operating signal provided from the input operating means; at least one OR logic means having a first input terminal for receiving the dither signals, a second input terminal for receiving the pulse signals, and an output terminal connected to the control terminal of the current supply means; a means for generating at least one selection signal based on the input operating signal; and a means for changing the output path of the pulse signals provided from the pulse generating means to the second input terminal of the OR logic means by being controlled by the selection signal.

The system according to the present invention further comprises a switch for indicating a start and a stop of a work; and a means for allowing the work to be initiated by controlling the operation of the solenoid controlled proportion valve in response to the input operational signal provided from the input operating means when the switch is ON state, and the work not to be initiated regardless of the input operational signals provided from the input operating means when the switch is not ON state.

The present invention further comprises a switch for indicating a start and a stop of a work; and a means for stopping the operation of the solenoid controlled proportion valve automatically when the input operating signal is not fed from the input operating means any more in a predetermined period from ON state of the switch.

The present invention further comprises a memory means for storing the predetermined parameters; and a means for changing the parameters in the memory means.

The present invention further comprises a switch controlling the automatic operation; a memory means for storing all data to control the solenoid controlled proportion valve when the switch is pushed for the first time; and a means for reading out the data from the memory means when the switch is pushed for the second time.

The present invention further comprises a means for sensing a current amount provided to the solenoid controlled proportion valve; and a failure diagnosis means for detecting whether or not a trouble occurs by the current amount sensed from the sensing means.

DETAILED DESCRIPTION OF THE INVENTION

Figure 4:
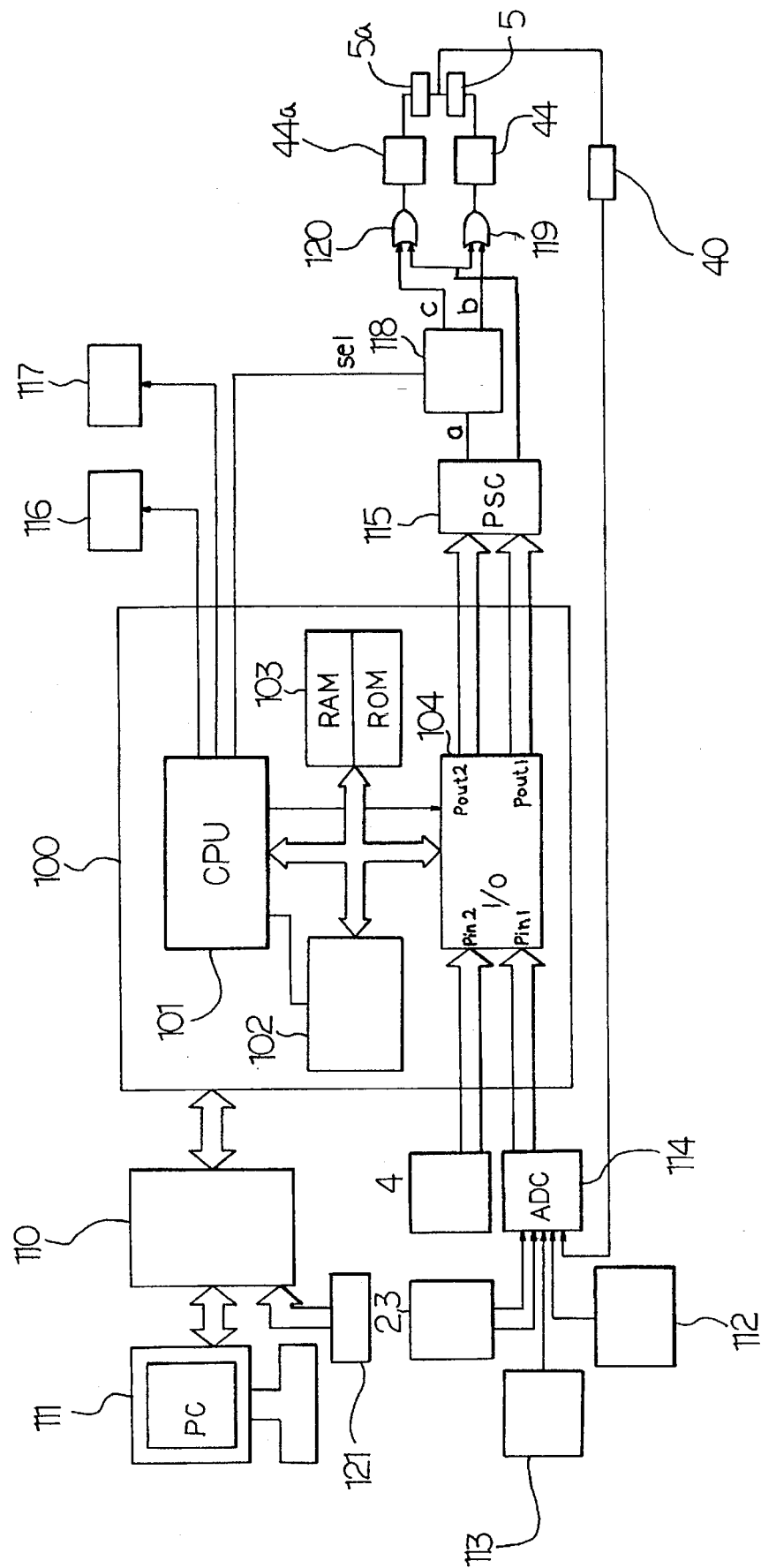
FIG. 4 illustrates a hardware construction view of an intelligent amplifier system according to the present invention.

FIG. 4 shows an embodiment of the amplifier system employing the microcomputer according to the present invention, which is used to control two proportion valves, and FIG. 5 shows a flow chart explaining its execution process.

First, referring to FIG. 4, the microcomputer 100 includes a central processing unit (CPU) 101 for performing various operation functions and control functions, an interrupt control unit 102, a memory 103 having a random access memory (RAM) and a read only memory (ROM), and an input/output processor 104.

In FIG. 4, an interface 110 for connecting the microcomputer 100 to an external personal computer (PC) 111, a start/stop switch 112 for controlling the equipment, and an automatic operation switch 113 for indicating the automatic repeating operation are shown.

Figure 1:
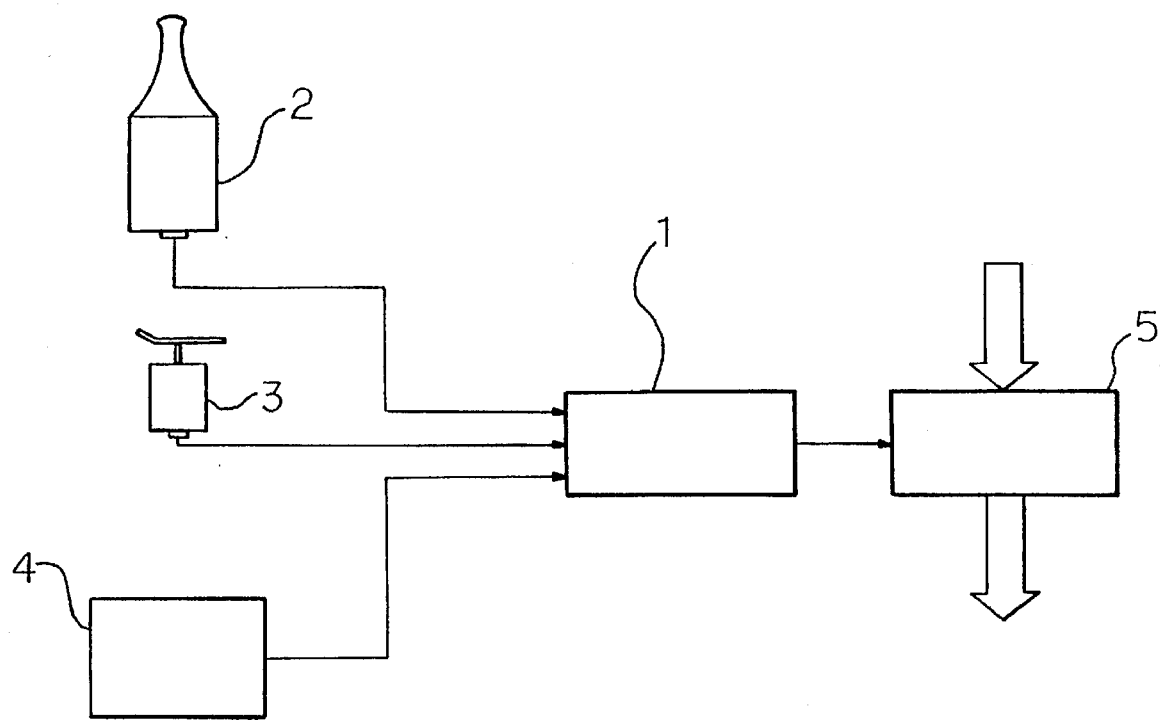
FIG. 1 illustrates a schematic block diagram of a mechanism for operating a solenoid controlled proportion valve.
Figure 2:
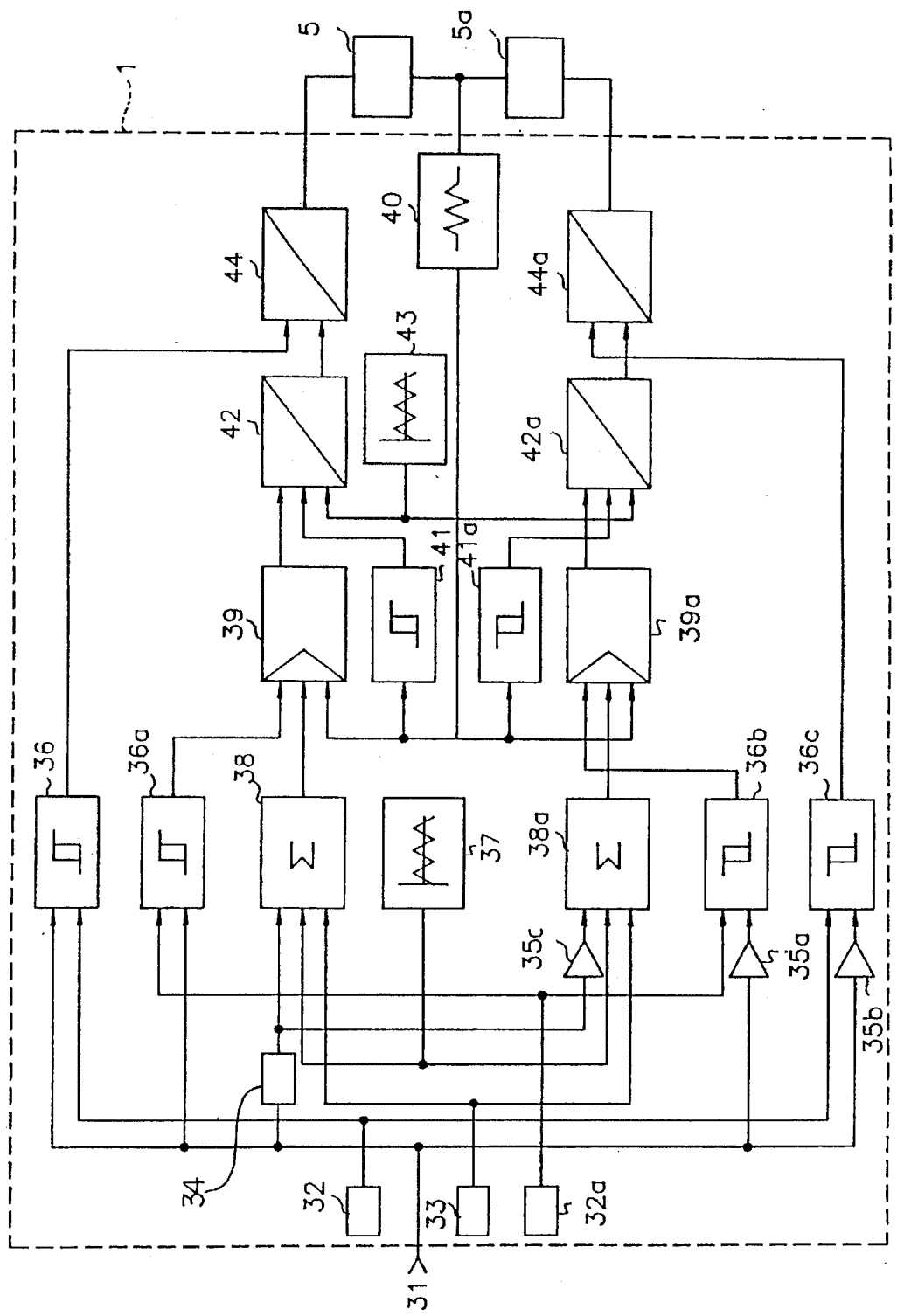
FIG. 2 illustrates a circuit diagram of a conventional analog amplifying circuit.

Some of input ports within the microcomputer 100 are connected directly to the well-known operating members (see reference numerals 2, 3 and 4 shown in FIG. 1) or connected through an analog to digital converter (hereinafter, referred to as A/D converter) 114 thereto.

The start/stop switch 112 and the automatic operation switch 113 are also connected to another input ports of the input/output processor through the A/D converter 114.

In a drawing, a reference numeral 115 designates a parallel to serial (PS) converter connected to output ports of the input/output processor 104 and 116, and 117 designate an alarm and a display controlled by CPU 101 of the microcomputer 100, respectively.

A signal changing unit 118 for changing a signal path of a serial digital signal provided from the PS converter 115 controlled by the CPU 101 comprises a multiplexer.

Also, reference numerals 119 and 120 of which the output terminals are connected to control terminals of power transistors within electrical current supplying units 44 and 44a designate OR logic gates for logic operation of the outputs of the PS converter 115 and the signal changing unit 118.

A flow chart for explaining the process of the microcomputer 100 according to the present invention will be described in detail, referring to FIGS. 5 and 6.

Figure 5A:
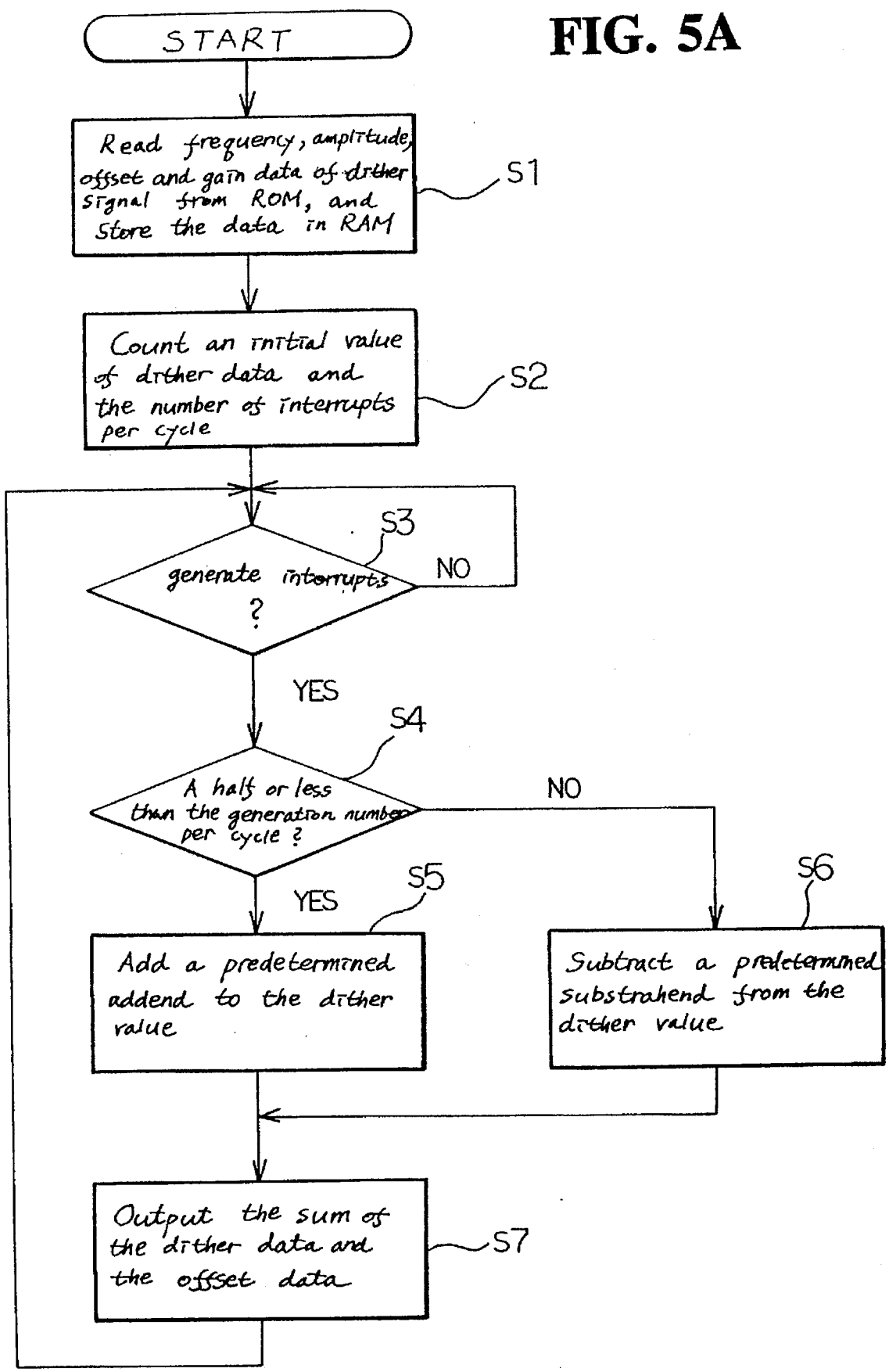
FIG. 5A illustrates a flow chart of a dither routine for generating a dither signal by a microcomputer.

FIG. 5A represents the flow diagram for the execution process of the dither signal generating means which is the first functioning means performed by microcomputer 100.

The operation of the dither signal generator will be described in the following, referring to FIG. 5A.

The dither signal generator comprises a CPU 101 and a memory 103. When the microcomputer 100 is reset by power supply, the dither signal generator reads from ROM of the memory 103 a frequency, amplitude, offset and gain data of the dither which have been preset, designates a specified area within RAM of the memory 103 to form the dither signal, and stores the read-in data in the said specified area (step S1) (for example, designate variable DITH_VALUE in the OFF address of RAM).

Then, in step S2, an initial value of dither data and the number of interrupts per cycle of the dither signal to be formed are counted.

For example, if the set value of the dither frequency read from ROM is 50 Hz, the set value of the dither amplitude is 1 V (2 V p—p), and the interrupt for forming the dither signal is generated at an interval of 1 msec from an interrupt controller 102, then the initial value of the dither is set to −1 V and 20 interrupts are generated in one cycle since the period of the cycle of the dither signal to be formed is set to 20 msec.

For the next, the dither signal generating means detects whether or not the interrupt is generated from the interrupt controller 102 (step S3).

If the interrupt has been generated in step S3, it is detected whether or not the generated interrupt is such that the number of interrupts are a half or less than the generation number per cycle (for example, 10 interrupts or less in case of 20 times per period) (step S4).

If the number of the generated interrupts are a half or less of the interrupt generation numbers per period (i.e., "YES" in step S4), a predetermined addend is added to the dither value (step S5). This addend is determined by the generation numbers of interrupt per cycle of the dither signal to be formed and a peak value (i.e., two times the amplitude value).

As explained above, if the interrupt generation numbers per cycle is 20 and the peak value is 2 V p—p, the addend value is 200 mV.

Accordingly, if the first interrupt is generated within one period, the dither data is −1 V+200 mV, and if the second interrupt is generated, the dither data value changes to −1 V+400 mV. Also, if 10 th interrupt, the last one of the first haft period is generated, the dither value is 1 V.

If the present interrupt is not a half or less than the interrupt generation numbers per cycle (i. e., "NO" in step S4), a predetermined subtrahend is subtracted from the dither value (step S6). This subtrahend is the same value as the addend described above. For example, when the 11 th interrupt of a first period is generated, the dither value is 1 V−200 mV, and when the last interrupt (i.e., 20 th interrupt) is generated, the dither value is −1 V.

As a result, the dither signal of a triangular wave can be formed.

After the dither value is determined in response to the interrupt generation as mentioned above, it is added to an offset value in order to obtain a constant offset current (step S7).

The dither data provided from the dither generating means whenever the interrupt is generated are recorded in a register (not shown) which corresponds to an output port Pout1 of the input/output processor 104, and then fed to the PS converter 115.

A parallel dither data which are produced from the input/output processor 104 are converted to serial data by the PS converter 115, and provided to two OR gates 119 and 120.

Accordingly, the proportion valves 5 and 5a are trembled (oscillated) with a very small displacement.

A means for controlling current to the proportion valves 5 and 5a in response to the input operation signal which is fed from the electric joystick 2, the electric pedal 3 and the external controller 4 has a hardware construction as shown in FIG. 4.

The joystick 2 and the pedal 3 for sending out the analog signal are connected to an input port of the A/D converter 114 coupled to the input/output processor 104 of microcomputer 100, and the external controller 4 for sending out the digital signal is connected directly to the input port of the input/output processor 104.

The A/D converter 114 may be placed within the input/output processor 104 of the microcomputer 100.

The input/output processor 104 receives data from the external through input port Pin1 and Pin2 depending on the instruction of the CPU 101, or sends out the data provided from the CPU 101 or the memory 103 to the external through output ports Pout1 and Pout2.

Whenever the interrupt is generated by the interrupt controller 102, the CPU 101 makes commands so that the input/output processor 104 receives the data.

Figure 5B:
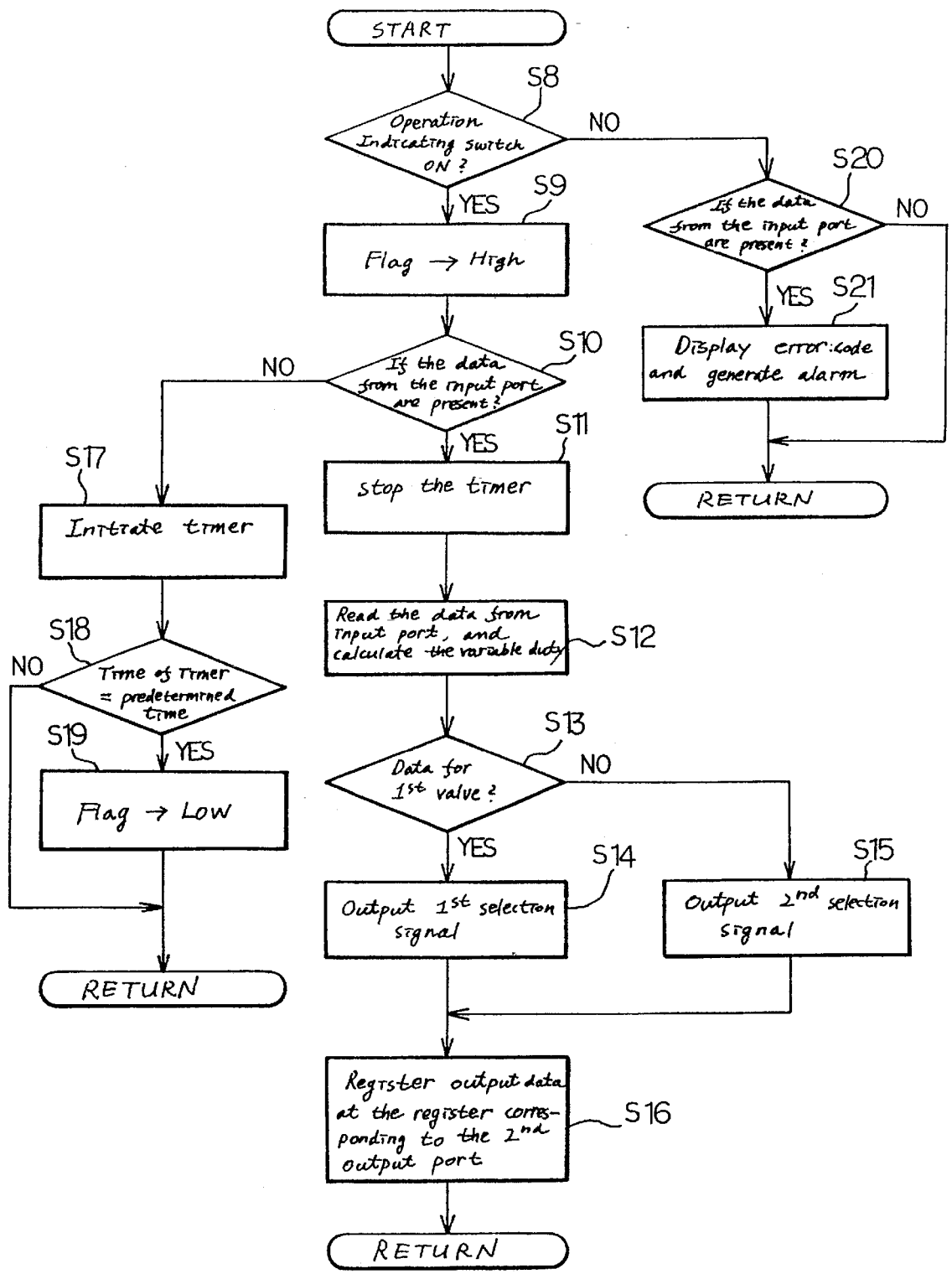
FIG. 5B illustrates a flow chart explaining a sequential process being performed by the microcomputer.

The CPU 101 receives the data from the input ports Pin1 and Pin2 of the input/output processor 104, and, in response to the received data, controls the proportion valves 5 and 5a, as shown in the flowchart of FIG. 5B.

In order to control the operation of proportion valves 5, 5a, CPU 101 executes the control to generate the pulse of a variable duty corresponding to the input data. Whether or not the operator of the hydraulic equipment is willing to run the equipment is transferred to microcomputer 100 by operation indicating switch 112.

When the start/stop switch 112 is pushed by user to operate the heavy hydraulic equipment, the CPU 101 sets a flag within RAM to "H (high)" state, and when the switch 112 is pushed again to stop the equipment, the flag turns to "L (low)" state. Accordingly, pushing the switch 112 turns the start flag to "High (logically 1)" (step S9).

A predetermined value is set in a timer, and its value increases or decreases in step S9, the input data is received every time the interrupt is generated when the timer reaches a predetermined value or 0, and the operation of the input data is performed.

Accordingly, when the interrupt has occurred, it is determined whether the data to be read from the input ports Pin1 and Pin2 of the input/output processor 104 is present or not. If the data is present, the operation of the timer is stopped (step S11), and a predetermined operation is performed by reading the data from the input port, where a variable duty for generating the output current is calculated corresponding to the value of the gain value times the input data provided from the operating means 2 and 3 and the external controller 4 (step S12).

In step S13, it is determined whether or not the input data is for controlling the operation of the first valve 5. If the said input data is for the operation of the first valve, a selection signal in the first level (or logical "1") is fed to a selection port b of the path router 118, allowing ports a and b to be electrically connected to each other.

If the input data is not for the first valve, a selection signal in the second level (or, logically "0") is fed to a selection port C of the path router 118, allowing the ports a and c to be connected to each other.

It is noted that a number of the selection signals provided from the CPU 101 to the path router 118 may be varied depending on the number of valves.

In step S16, the data resulting from the final operation of the input data are given as the output data to a register (hot shown) within the input/output processor 104 which corresponds to the output port Pout2.

When the output data is given to the register, it is then fed to the PS converter 115 through the output port Pout2.

The PS converter 115 converts the received parallel data to the serial data and sends it to the changer 118.

When the output data correspond to the input data for controlling the first valve 5, the pulses provided from the PS converter 115 are fed to OR gate 119 through the path router 118 which is being controlled by the selection signal in the first level. When the output data correspond to the input data for the second valve 5a, the pulses are fed to OR gate 120.

On the other hand, if the data to be read from the input port is not present when the start flag is in "HIGH" state (i. e., "NO" in step S10), the operation of the internal timer is initiated (step S17).

If the time of timer equals to a predetermined time, for example, 5 or 10 minutes (step S18), the start flag becomes "LOW" state (step S19).

Such steps S17 to S19 can be utilized to stop automatically the equipment if the operator leaves from his place without depressing the start/stop switch 112 during operation, whereby the equipment is stopped temporarily.

In the meantime, if the equipment is operated by an operator or an outsider without the switch 112 ON, the input data is fed to the input port, but the equipment is not operated, while an alarm is operated through an alarm unit 116 and an error code is displayed on a display unit 117 (steps S20 and S21).

As a result, when the operator gets in and out of his seat, it is possible to prevent the errorneous operation of the equipment caused by the undesirable touch with the operating means such as the joystick 2 and pedal 3.

Accordingly, the present invention is provided with a protective mechanism for controlling the equipment through the microcomputer 100 according to the ON/OFF state of the start/stop switch, preventing trembles due to the errorneous operation and unexpected accidents.

Figure 5C:
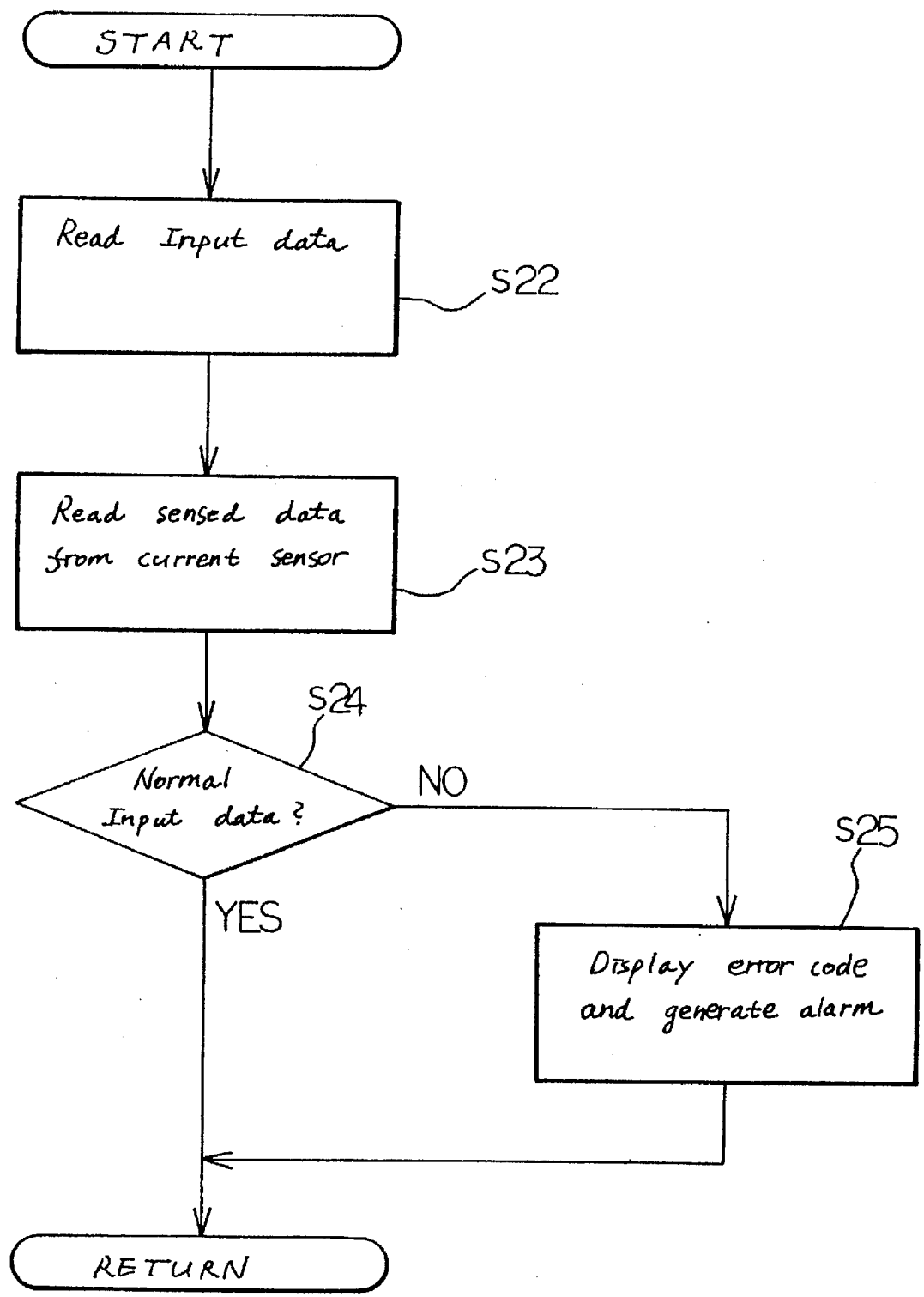
FIG. 5C illustrates a flow chart of a failure diagnosis routine in the system.

Now, the failure diagnosis system will be disclosed with reference to FIG. 5C.

Figure 3:
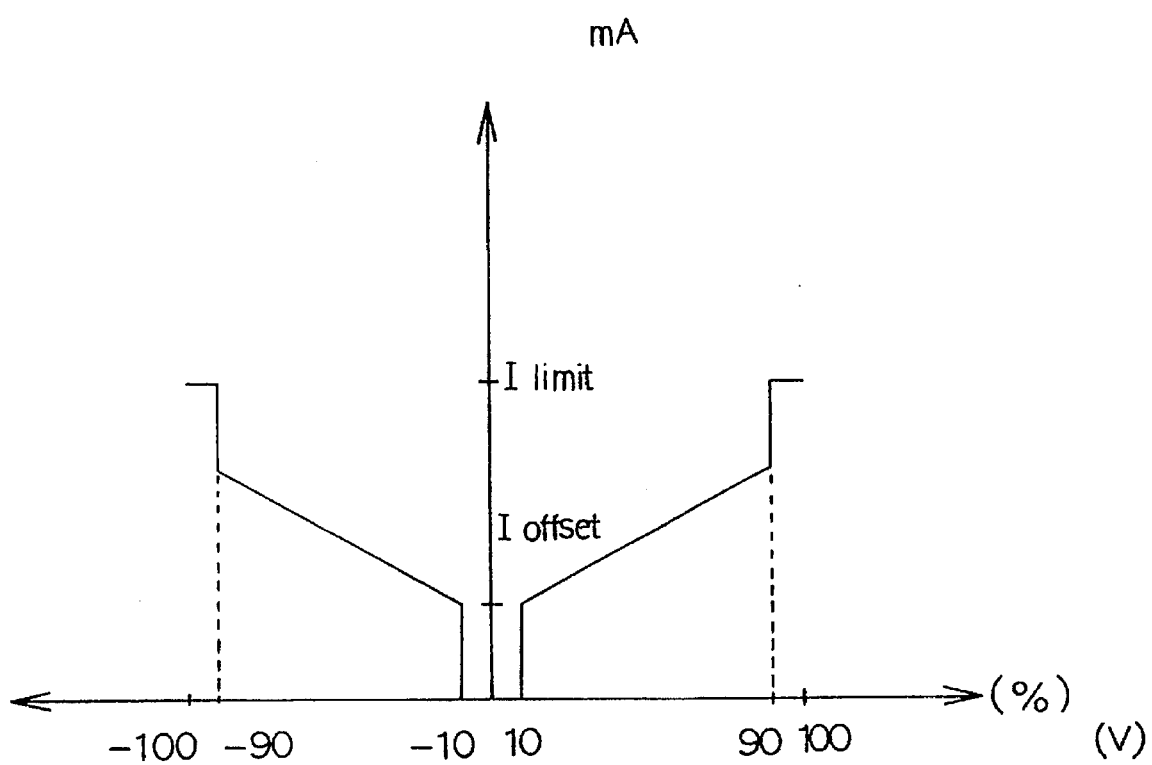
FIG. 3 illustrates a characteristic view of input/output signals of an amplifier circuit for a valve control.

An external power supply (not shown) for supplying a bias voltage to the electric joystick 2, the electric pedal 3, and the input elements 2, 3 and 4 are designed in such a way that when these elements are in trouble, the output at the failure time exceeds the preset input range. For example, a bias voltage of D. C. 20 volts is applied to the joystick or the pedal 3. When the input voltage shown in the characteristic curve of FIG. 3 is 100%, its output is D. C. 20 volts, and when it is −100%, its output is D.C. 10 volts, Thus when it is in neutral position, its output is D. C. 15 volts.

Accordingly, when the input operating means 2 and 3 or the bias power supply, etc. get in trouble, the microcomputer 100 receives an abnormal signal from the input means 2 and 3, etc., and the failure diagnosis means being controlled by the microcomputer 100 indicates the failure through the alarm unit 116 and the display unit 117.

Also, if there is a remarkable difference between a sensed data which is fed-back through the A/D converter 114 from the current sensor 40 and an expected data (or, normal signal data), or if the feed-back signal is not present (i.e., the sensed data is zero), the failure diagnosis means indicates the failure through the alarm unit 116 and the display unit 117 since it is assumed that the proportion valves 5 and 5a or the current sensor are in trouble (step S22~S25).

The failure diagnosis means not only displays its test results, but indicates when the power voltage provided to the means exceeds the allowable range.

A method for setting the offset, gain, amplitude and frequency data of the dither according to the invention will be described.

The data set according to the present invention can be determined by the following three ways.

1. Vector Table Method

Firstly, 3 data vector tables, in which each data consists of frequency, amplitude, gain, and offset data are prepared on ROM of the memory 103.

If one of n data in such tables is selected using a DIP switch 121, it is possible to reset parameters such as frequency, amplitude, gain, offset data, etc.

For example, if a first pointer value on the vector table is such that the dither frequency=50, amplitude=2, gain=0.8 and offset=3, it is selected by DIP switch 00000 and if a final pointer data is 500, 20, 8, and 30, respectively, it is selected by DIP switch 11111.

2. Another method for setting the data is that the parameters are recorded directly in the corresponding addresses of RAM in the memory 103. Data recorded in ROM are stored in a predetermined area of RAM, and values of parameters stored in this RAM are changed. That is, when the microcomputer is reset, parameters are recorded through an input means such as a keyboard. For instance, when *(or ERASE button) is depressed, parameters in RAM can be erased. Then, after # button is depressed, a value which corresponds to the dither frequency is put in followed by #+dither amplitude value, #+gain value and #+offset value, resulting in the record of new parameters in a predetermined area of RAM.

3. Still another method for changing the parameters is the method utilized when ROM of the memory 103 is consisted of EEPROM (Electrically Erasable and Programmable ROM).

In this method, after the external PC 111 is connected to the microcomputer 100 through the interface 110, new parameters are written directly in the EEPROM.

An automatic repeating function according to the present invention will be described in the following.

In case that a simple repeating operation is performed by controlling the operation of the proportion valves 5 and 5a, a start information for this operation is provided to the microcomputer 100 through an automatic operating switch 113. At this time, the microcomputer 100 stores all the processes in RAM of the memory 103 until the switch 113 is depressed again. If the operation amount exceeds a capacity of the memory 103, the alarm unit 116 is operated and such situation is displayed in the display unit 117.

If the automatic operation switch 113 is depressed again, microcomputer 100 controls the operation of valves 5, 5a by reading out successively the operation processes recorded in the memory 103.

As has been explained, according to the present invention, there is provided an intelligent amplifying system using a microcomputer, which has the advantage that the size and weight of system hardware can be greatly reduced compared with those of the conventional analog amplifying system.

In addition, it is possible not only to increase the adaptability of the equipment to the valve by being able to change the parameters easily, but to enhance the safety factor by employing the safety mechanism.

Also, according to the present invention, the failure diagnosis of the system is provided, so that the working efficiency of the equipment can be increased.

Although the present invention has been described with reference to the preferred embodiment thereof, many modifications and alterations may be made within the scope of the appended claims.

What is claimed is:

1. An amplifying system for controlling an operation of at least one solenoid controlled proportion valve by providing a control signal in response to an input operating signal provided from an input operating means to a control terminal of at least one current supplying means connected to the solenoid controlled proportion valve, comprising:

means for generating dither signals of a triangular wave having a predetermined frequency and amplitude by predetermined parameters;

means for generating pulse signals of a variable duty having a predetermined gain in response to the input operating signal provided by the input operating means;

at least one OR logic means having a first input terminal for receiving the dither signals, a second input terminal for receiving the pulse signals, and an output terminal connected to the control terminal of the current supply means;

means for generating at least one selection signal in response to the input operating signal; and means for changing the output path of the pulse signals provided from the pulse generating means to the second input terminal of the OR logic means in response to the selection signal.

2. The amplifying system according to claim 1, further comprising:

a switch for indicating a start and a stop of a work cycle; and a means for allowing the work cycle to be initiated by controlling the operation of the solenoid controlled proportion valve in response to the input operational signal provided from the input operating means when the switch is ON state, and the work not to be initiated regardless of the input operational signals provided from the input operating means when the switch is not ON state.

3. The amplifying system according to claim 1, further comprising:

a switch for indicating a start and a stop of a work cycle; and a means for stopping the operation of the solenoid controlled proportion valve automatically when the input operating signal is not fed from the input operating means in a predetermined period beginning from the ON state of the switch.

4. The amplifying system according to claim 1, further comprising:

a memory means for storing the predetermined parameters; and a means for changing the parameters in the memory means.

5. The amplifying system according to claim 1, further comprising:

a switch controlling the operation;

a memory means for storing all data to control the solenoid controlled proportion valve when the switch is pushed for the first time; and a means for reading out the data from the memory means when the switch is pushed for the second time.

6. The amplifying system according to claim 1, further comprising:

a means for sensing n current amount provided to the solenoid controlled proportion valve;

a failure diagnosis means for detecting whether or not a problem occurs by the current amount sensed from the sensing means;

a means for generating an alarm signal when the occurrence of the problem is detected by the failure diagnosis means; and a means for displaying the situation when the problem occurs.

7. The amplifying system according to claim 2, further comprising:

a means for stopping the operation of the solenoid controlled proportion valve automatically when the input operating siganl is not fed from the input operating means any more in a predetermined period from ON state of the switch.

8. The amplifying system according to claim 7, further comprising:

a memory means for storing the predetermined parameters; and a means for changing the predetermined parameters in the memory means.

9. The amplifying system according to claim 8, further comprising:

a means for sensing a current amount provided to the solenoid controlled proportion valve;

a failure diagnosis means for detecting whether or not a trouble occurs by the current amount sensed from the sensing means;

a means for generating an alarm signal when the occurrence of the trouble is detected by the failure diagnosis means; and a means for displaying the situation when the trouble occurs.

* * * * *